United States Patent [19]

Birgmeir et al.

[11] Patent Number: 5,703,700
[45] Date of Patent: Dec. 30, 1997

[54] METHOD OF ENHANCING A PRINT OF A TRANSPARENCY

[75] Inventors: Klaus Birgmeir, Putzbrunn; Hermann Waibel, Munich, both of Germany

[73] Assignee: Agfa-Gevaert Aktiengesellschaft, Leverkusen, Germany

[21] Appl. No.: 406,643

[22] Filed: Mar. 20, 1995

Related U.S. Application Data

[63] Continuation of Ser. No. 847,821, Mar. 6, 1992, abandoned.

[30] Foreign Application Priority Data

Apr. 4, 1991 [DE] Germany .......... 41 10 0813.2

[51] Int. Cl.⁶ .................................................. H04N 1/04
[52] U.S. Cl. .................. 358/487; 358/475; 358/506; 358/509; 399/151
[58] Field of Search .................. 358/487, 475, 358/474, 480, 482, 504, 506, 505, 509, 510, 518, 406; 382/162, 167; 399/47, 138, 146, 151, 316; H04N 1/04

[56] References Cited

U.S. PATENT DOCUMENTS

| | | | |
|---|---|---|---|
| 3,790,275 | 2/1974 | Hubol et al. .................. | 355/68 |
| 4,689,691 | 8/1987 | Isogai et al. .................. | 358/280 |
| 4,757,351 | 7/1988 | Birgmeir ...................... | 355/38 |
| 4,907,077 | 3/1990 | Schulz-Hennig ............... | 358/80 |
| 5,060,061 | 10/1991 | Shishido ..................... | 358/80 |
| 5,155,596 | 10/1992 | Kurtz et al. .................. | 358/214 |
| 5,216,521 | 6/1993 | Birgmeir ...................... | 358/447 |

*Primary Examiner*—Edward L. Coles, SR.
*Assistant Examiner*—Madeleine AV. Nguyen
*Attorney, Agent, or Firm*—Darby & Darby

[57] ABSTRACT

A transparency to be printed is scanned to generate density values which are used to determine the degree of exposure of the transparency. The transparency is further scanned to generate signals representing an image of the transparency. The scanner which is employed for the latter scanning procedure and produces the signals has a linear scanning range and, based on the degree of exposure of the transparency, the illumination intensity or integration time of this scanner is controlled such that the master is scanned within the linear range. The signals generated by the scanner are corrected using a characteristic line selected in dependence upon the degree of exposure of the transparency, the color temperature and/or the film type. The corrected signals are processed to additionally enhance the image of the transparency and are then used to print the image.

28 Claims, 4 Drawing Sheets

METHOD OF ENHANCING A PRINT OF A TRANSPARENCY

This is a continuation of application Ser. No. 07/847,821, filed Mar. 6, 1992, abandoned.

BACKGROUND OF THE INVENTION

The invention relates generally to the reproduction of a master.

More particularly, the invention relates to a method in which a master is scanned pointwise along lines using a light source and a photoreceiver. The photoreceiver generates a series of image signals which undergo electronic image processing or enhancement, and the enhanced signals are used to print an image of the master on copy material pointwise along lines by means of a printing beam. In this method, the density of the master is measured prior to the pointwise scanning procedure and the magnitudes of the image signals are regulated on the basis of the measured density.

Such a method is disclosed in the German Offenlegungsschrift 36 29 793 which generally describes a procedure for copying colored masters pointwise along lines. The masters are successively scanned in the three primary colors red, green and blue by a linear CCD which is moved across a projected image of the master. In order not to exceed the dynamic range of the linear CCD for masters of greatly differing density, the magnitudes of the image signals are regulated by controlling the illumination intensity of the photoreceiver in such a manner during the scanning procedure that this dynamic range is adhered to. Means disclosed as being appropriate for control of the illumination intensity are gray scales, or adjustable diaphragms disposed in the illuminating or printing path.

The method of the Offenlegungsschrift is not adapted to correct exposure errors, whether overexposures or underexposures, arising when a photograph is taken. Also requiring correction are films which are exposed with artificial light but have emulsions designed for daylight exposure.

In conventional photography, it is attempted to compensate for these deviations by adjusting the amount of copy light such that the portions of the master which are significant for the image are printed on an average density zone of the copy material. A drawback here is that the copy material is designed to be usable only for properly exposed diapositives when too steep a gradation is produced by the system. For improperly exposed diapositives, the color reproduction and gradation of the copy sometimes deviate from the light distribution in the original scene even more strongly than the diapositive itself.

The procedure described earlier, which involves pointwise exposure along lines with correction for each individual image point, presents the opportunity to correct intensity and contrast using certain characteristic lines for the transformation from master intensity to image intensity in the printing unit. In particular, the lightest and darkest locations of the master can be positioned on the light and dark areas of the copy material. By using a specified characteristic line and varying the intensity, a reproduction of a normally exposed diapositive can be made to look like the original scene. Underexposed and overexposed diapositives will have the correct average intensity but an improper gradation. So-called density-dependent color errors, which can be traced to the different sensitivities of the color layers outside of the middle range, can also arise, especially for improperly exposed masters.

SUMMARY OF THE INVENTION

It is an object of the invention to provide a method which makes it possible to determine the degree of exposure of a master, or the degree of improper exposure, at least approximately coincidentally with the generation of image signals to be employed for reproduction of the master.

Another object of the invention is to provide a method which allows the degree of exposure of a master, or the degree of improper exposure, to be taken into account for further processing upon, or immediately following, the generation of image signals to be employed for reproduction of the master.

A further object of the invention is to provide an apparatus which enables the degree of exposure of a master, or the degree of improper exposure, to be taken into consideration for processing upon, or directly after, the production of image signals to be employed for reproduction of the master.

The preceding objects, as well as others which will become apparent as the description proceeds, are achieved by the invention.

One aspect of the invention resides in a method of copying a master. The method comprises the steps of scanning the master using a scanning device with a substantially linear scanning range; establishing the degree of exposure of the master; and controlling the scanning step based on the established degree of exposure so that at least one portion of the master which is significant in reproduction of the master is scanned within the linear scanning range of the scanning device.

The scanning device may comprise a photoreceiver, and the scanning step can be carried out using a light source in conjunction with the photoreceiver. The photoreceiver preferably includes a CCD.

The method can further comprise the steps of generating signals, which represent an image of the master, with the scanning device, and modifying the signals using a characteristic line selected on the basis of one or more of the properties of the master. Such properties can include the degree of exposure and the color temperature and, if the master is constituted by film, the film type.

The scanning step can be performed pointwise along a plurality of lines. The method may then additionally comprise the step of printing an image of the master on copy material, e.g., photosensitive copy paper, pointwise along a plurality of lines using the modified signals. Thus, the modified signals can be used to regulate a printing beam which produces an image of the master on the copy material.

The method can also comprise the step of subjecting the modified signals to electronic processing, that is, electronically enhancing the modified signals, prior to the printing step.

The controlling step may include controlling the illumination intensity or the duration of integration of the scanning device.

The degree of exposure of the master may be established using a density value obtained from the significant portion of the master.

According to one embodiment of the method, the establishing step comprises determining an integral density of the master, classifying the significant portion of the master as light or dark, and adjusting the integral density accordingly. Classification of the significant portion of the master may include visually evaluating the master.

In accordance with another embodiment of the method, the establishing step comprises weighting the densities of different regions of the master in dependence upon the positions of such regions in the master to obtain weighted density values, and summing the weighted density values. The weighting and summing steps are preferably performed automatically. The densities of the different regions may be obtained by scanning the master with the existing scanning device, and the establishing step may then further include branching off signals from the existing scanning device and reducing the number of branched-off signals to a manageable level. The weighting operation is here performed using the reduced number of branched-off signals.

If the master is colored, a plurality of sets of signals, each of which represents an image of the master in a different color, may be generated with the scanning device. For example, it is possible to generate a set of signals for each of the primary colors red, green and blue. A separate color channel can be provided for each set, and each set can be individually modified using a respective characteristic line selected on the basis of at least one of the properties of the master, e.g., on the basis of the degree of exposure of the master. The characteristic lines may be designed to compensate for density-dependent color errors of the master.

The controlling step may comprise adjusting the sensitivity of the scanning device to the master. In accordance with one embodiment of the method, this is accomplished by means of a light-attenuating device. The light-attenuating device can include an adjustable diaphragm positioned in the path of the light travelling from the master to the scanning device, or one or more gray filters which are pivotable into and out of the path, i.e., to and from a position in front of the scanning device.

According to another embodiment of the method, the operation of adjusting the sensitivity of the scanning device to the master is performed by varying the integration time of the scanning device, preferably electronically.

If the master is a transparency, e.g., a diapositive, the characteristic line used to modify the signals from the scanning device may constitute part of at least one set of characteristic lines for transparencies. As a first approximation, such set is derived by making transparencies, e.g., diapositives, of a gray scale using different exposures; scanning each of the gray scale transparencies with a scanner to generate density signals; plotting a respective empirical line for each gray scale transparency showing density signal magnitude as a function of density; and inverting the empirical lines. The scanning of the gray scale transparencies is performed in such a manner that the magnitude of the density signal for a predetermined step of the gray scale is the same for all gray scale transparencies.

Additional sets of characteristic lines can be derived similarly to the first set but under different conditions. For instance, if the master comprises film, each of the additional sets may be derived similarly to the first set but with different illumination, different film type or both different illumination and different film type. The set which is appropriate for the particular master being processed can be selected manually by an operator.

The various characteristic lines can be stored and this is preferably accomplished using a look-up table.

In accordance with the invention, the degree of underexposure or overexposure, i.e., the degree of exposure, of a respective master is first determined. The problem of determining the degree of exposure is similar to that arising in so-called integral exposure systems, and procedures for accomplishing this are known and can be used here. Based on a knowledge of the degree of exposure and, possibly, other causes of improper exposure such as, for example, the use of artificial light with daylight film, exposure of the photoelectric scanning device is now regulated in such a manner that overexposure or underexposure of a region significant for a respective image is compensated for. In addition, a characteristic line is then used to modify the image signals generated by the scanning device. Taking into account the properties of the recording material, e.g., film, this characteristic line compensates for defects in the image, especially defects in gradation, produced during the faulty exposure.

The novel features which are considered as characteristic of the invention are set forth in particular in the appended claims. The improved copying method itself, as well as the construction and mode of operation of a copying apparatus usable for the method, will, however, be best understood upon perusal of the following detailed description of certain specific embodiments when read in conjunction with the accompanying drawings.

DESCRIPTION OF THE PREFERRED EMBODIMENTS

Figure 1:
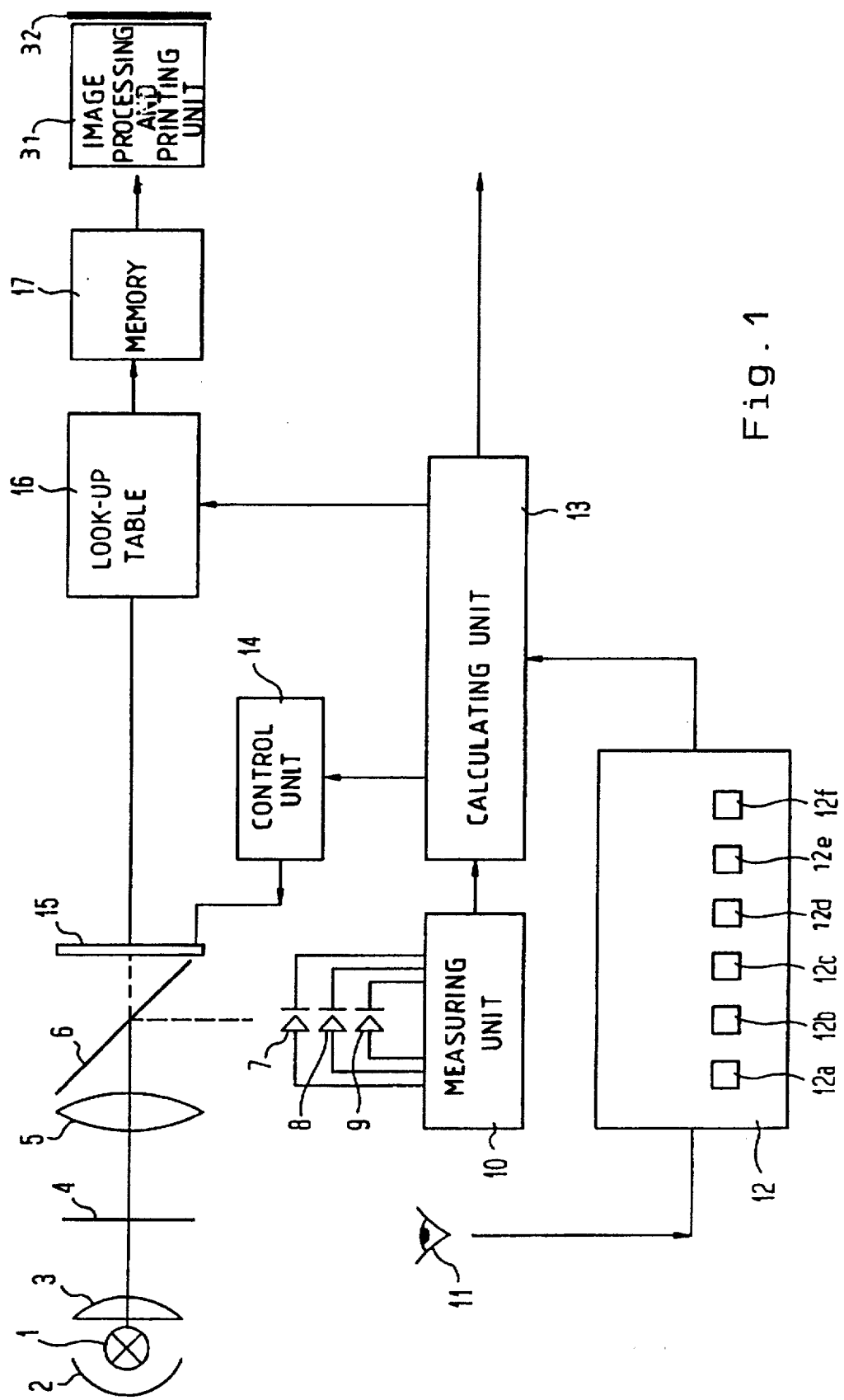
FIG. 1 schematically illustrates a copying apparatus including a manually controlled arrangement for determining the degree of exposure of a master to be printed.

In FIG. 1, the reference numeral 1 identifies a light source. A reflector 2 and a condenser 3 cause light from the light source 1 to uniformly illuminate a master or original 4 to be copied or printed. The master 4 may, for instance, be constituted by a transparency such as a diapositive. An image of the master 4 is sharply focused on a photoelectric scanning device 15 by means of an objective 5. By way of example, the scanning device 15 may be in the form of a linear CCD which, during the course of a scanning procedure, is moved perpendicular to its direction of elongation and parallel to the focal plane across the projected image of the master 4. In this manner, the master 4 can be scanned pointwise along lines. If the master 4 is colored, as is assumed to be the case here, the master 4 is successively scanned in each of the three primary colors red, green and blue to generate three color images. To this end, respective color filters are selectively moved into the path of the light travelling from the light source 1 to the CCD 15. These filters have been omitted for the sake of simplicity.

A partially transmissive reflector 6 is disposed between the objective 5 and the CCD 15, and the beam splitter 6 deflects the color images of the master 4 through 90 degrees to three integral sensors 7, 8 and 9. The integral sensors 7,8,9 are respectively sensitized in one of the three primary colors red, green and blue. The sensors 7,8,9 are connected to a measuring unit 10 which functions to determine average integral values. The measuring unit 10 generates signals which represent either the values for the three primary colors or a gray value, that is, a combination of the values for the three primary colors. These signals are sent to a first input of a calculating unit 13 which serves to determine the degree of exposure. Alternatively or in addition to the integral measuring procedure, the scanning device 15 can be used for the production of a mosaic image for a complex ADK.

A data entry unit or keyboard 12 having keys 12a,12b, 12c, 12d,12e,12f is connected to a second input of the calculating unit 13. The keys 12a–12f are activated by an operator 11 in accordance with the operator's observations about the nature of the master 4. For instance, the key 12a can be activated to mark a properly exposed master, the key 12b where a portion of a master significant for an image is light, the key 12c where a portion of a master significant for an image is dark, the key 12d for a master exposed using artificial light, and so on.

The calculating unit 13 has a first output which is connected to a control unit 14 for the CCD 15 and a second output which is connected to a memory 16 for characteristic lines. The CCD 15 generates three sets of image signals which respectively represent red, green and blue images of the master 4, and these image signals are sent to the memory 16 for modification or correction by the characteristic lines stored in the memory 16. Depending upon the degree of exposure or brightness of the master 4, the control unit 14 determines the illumination intensity integration time required for each individual row of points of a color image to assure that the master 4, or at least the portions thereof significant for the color image, are scanned in the linear scanning range of the CCD 15 and are thus properly reproduced.

The memory 16, which is here assumed to be constituted by an LUT, contains characteristic lines for every type of improper exposure of the master 4. These characteristic lines will be described with reference to FIGS. 3 and 4. Each of the three sets of signals representing the images of the master 4 in the three primary colors red, green and blue is corrected by a respective characteristic line and then forwarded to a memory 17 for the images. The memory 17 is connected to an image processing or enhancing arrangement which can be designed approximately in accordance with FIG. 1 of the German Offenlegungsschrift 36 29 793. The image processing arrangement is, in turn, connected with a printing arrangement which serves to print the enhanced or improved color images of the master 4 on photosensitive copy paper 32 pointwise along lines by means of a printing beam. The image processing arrangement and printing arrangement are here illustrated as a combined image processing and printing unit 31.

Figure 3:
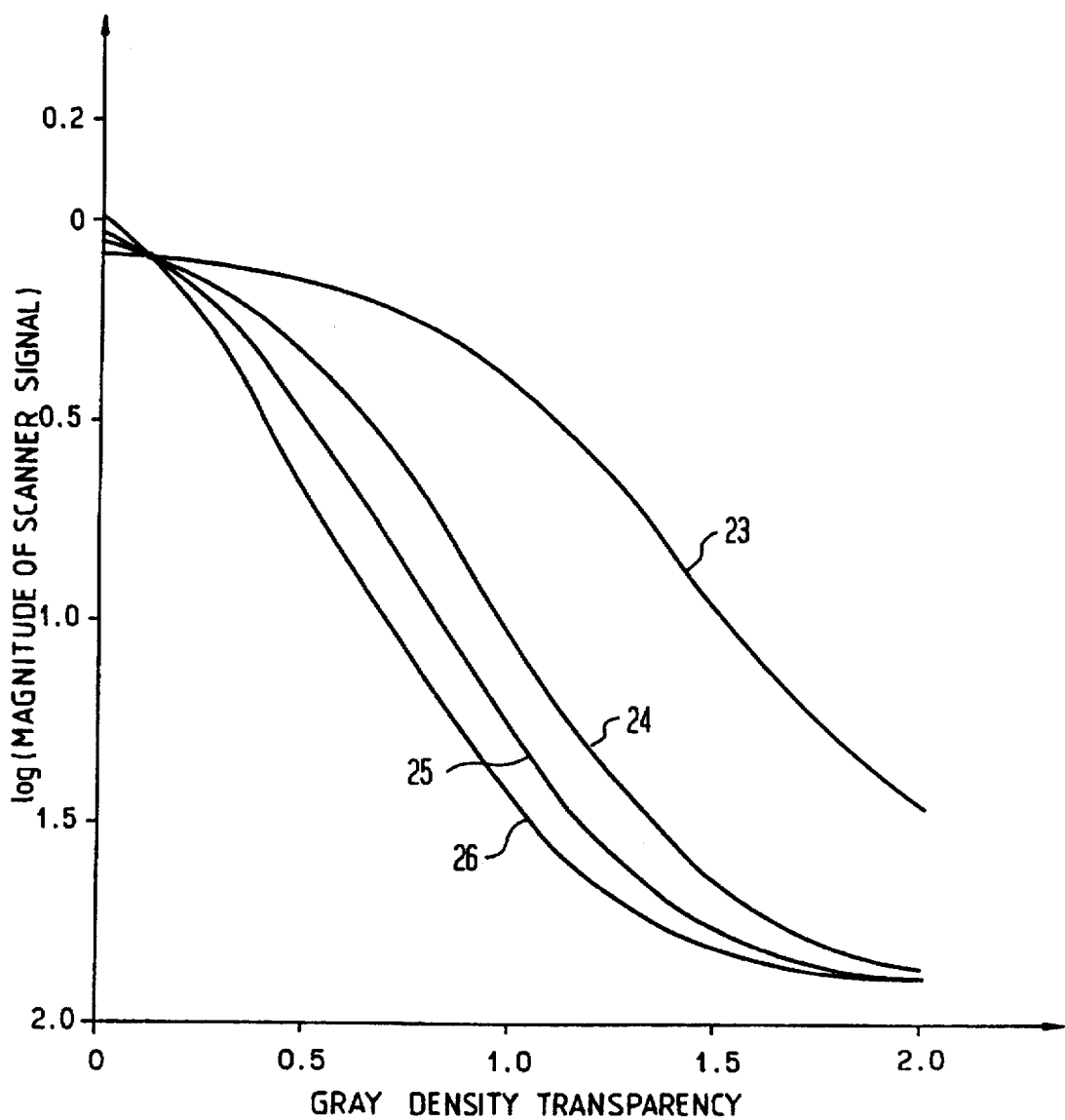
FIG. 3 illustrates a set of normalized darkening curves obtained by photographing an object with different degrees of exposure.

FIG. 3 shows a family or set of empirical lines 23, 24, 25 and 26 on a plot of "Gray Density of Transparency" as abscissa versus "log(Magnitude of Scanner Signal)" as ordinate. The lines 23,24,25,26 were obtained by photographing the same object using various exposures to generate a set of differently exposed diapositives and then measuring the gray densities of the diapositives with the CCD 15. Each of the lines 23,24,25,26 corresponds to one of the diapositives. The object photographed was a gray scale, and measurement of the densities via the CCD 15 was carried out in such a manner that the magnitude of the signal generated by the CCD 15 was the same for the white areas or steps of all diapositives. The density of the white area of a diapositive thus corresponds to the degree of improper exposure, and the degree of improper exposure is represented by a value of 0.2 D to 0.6 D. A value of 0.3 D represents the correct exposure for the empirical line 25.

Figure 4:
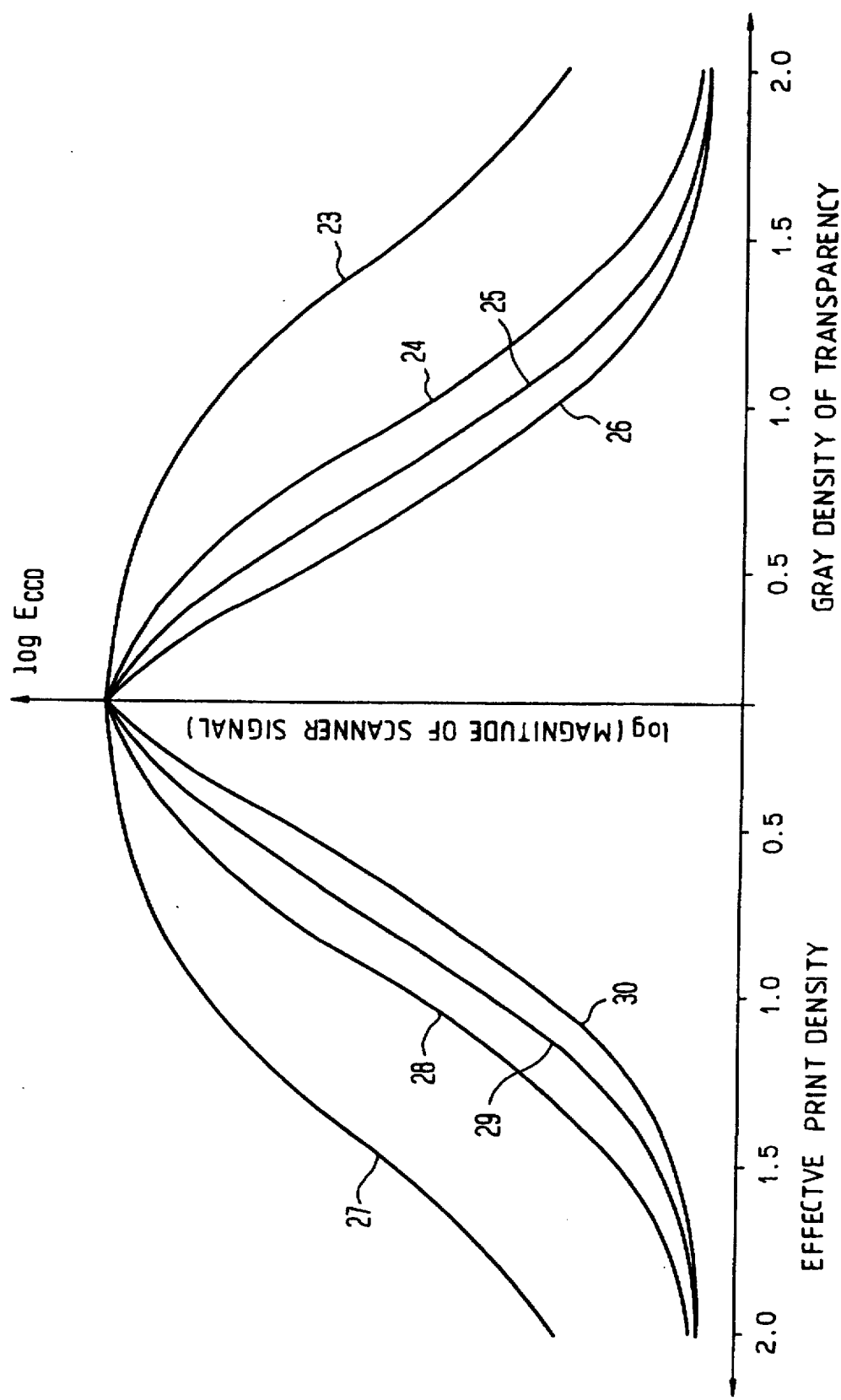
FIG. 4 illustrates a set of characteristic lines derived from FIG. 3 and serving to compensate for exposure errors.

If now, as shown in FIG. 4, the empirical lines 23,24,25, 26 are inverted, that is, a mirror image of the empirical lines 23,24,25,26 is formed about a vertical axis passing through the intersection of the lines 23,24,25,26, i.e., through the point corresponding to the white areas of the diapositives, a family or set of characteristic lines 27, 28, 29 and 30 is obtained. The characteristic lines 27,28,29,30, which are stored in the LUT 16 and are used to correct the image signals or density values generated by the CCD 15, represent plots of "Effective Print Density" as abscissa versus "log (Magnitude of Scanner Signal)" as ordinate. The reference to making a mirror image of the empirical lines 23,24,25,26 so as to obtain the characteristic lines 27,28,29,30 is intended to simplify the explanation of how the characteristic lines 27,28,29,30 are determined. In practice, there are certain criteria which result in deviations from an exact mirror image. To take into account different exposure characteristics associated with differently colored scene illumination, e.g., artificial light or daylight, or the greatly differing chromaticity of different films, a unique family or set of characteristic lines as in FIG. 4 is provided for each illumination color cast and each film type. A particular family can be manually recalled from the LUT 16 by activating one of the keys 12a–12f of FIG. 1. For film having an automatically readable code at the margin identifying the film type, the reader output can be entered directly into the control system.

The advantage of exposure control which, in accordance with FIG. 3, is based on a fixed signal magnitude for the white area of the gray scale resides in that the curves do not abut in the light regions. However, for dark subjects, there is an insufficiently large signal-to-noise ratio when the scanner dynamics are low. Due to the greater possible variability, a tendency towards an average value of the intensity during exposure of the CCD 15 is therefore to be preferred. Nevertheless, the pulsing of the image signal then counteracts the greater resolution at high densities. Development of the characteristic lines takes place in the same manner as in FIG. 4 by mirror imaging about an appropriate axis.

It has been found expedient to use seventeen different exposure steps, namely, eight for overexposure, one for proper exposure and eight for underexposure.

It has been shown to be of importance to assign fixed exposures or sensitivities of the CCD 15 to the fixed families of characteristic lines because only then is there a distinct improvement in the printed image.

Figure 2:
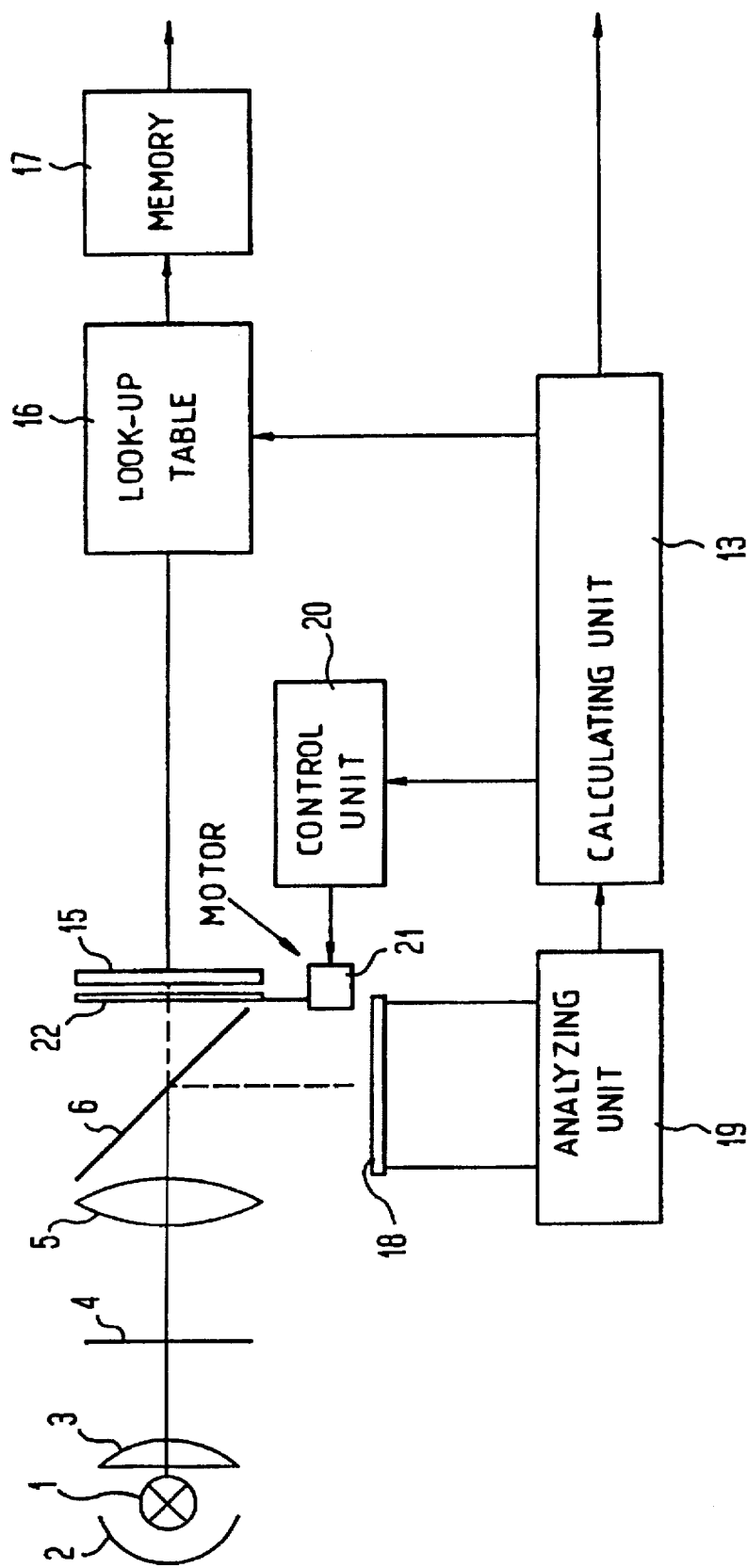
FIG. 2 schematically illustrates another copying apparatus including an automatic arrangement for determining the degree of exposure of a master to be printed.

FIG. 2 illustrates a modification of the apparatus of FIG. 1, and elements of FIG. 2 which are functionally the same as those of FIG. 1 have the same reference numerals and will not be described again in detail.

In contrast to FIG. 1, the partially light-transmissive reflector 6 of FIG. 2 focuses an image of the master 4 on a flat CCD 18 which is connected to an analyzing unit 19 serving for analysis of the master 4. The analyzing unit 19 fully automatically evaluates the individual regions of the master 4 on the basis of their locations within the master 4. The analyzing unit 19 generates density values based on the evaluations and integrates these values to obtain a corrected target density value for the master 4. Such an analyzing unit is disclosed, for instance, in U.S. Pat. No. 3,790,275. A visual observation of the master 4 as in FIG. 1 can thus be omitted but could also be used in combination with the analyzing unit 19.

Determination of the degree of exposure of the master 4 again takes place in the calculating unit 13 which controls selection of the appropriate characteristic correction line in the look-up table 16. In addition, the calculating unit 13 controls the pivoting of one of a plurality of gray filters 22 to a position in front of the CCD 15, that is, into the path of the light travelling from the light source 1 to the CCD 15. To this end, the calculating unit 13 is connected to an illumination control unit 20 which, in turn, regulates a filter drive or motor 21. Depending upon the transmissivity of the master 4, the gray filter 22 which is pivoted in front of the CCD 15 causes a greater or lesser attenuation of the light from the light source 1 prior to impingement of the light on the CCD 15, i.e., the gray filter 22 changes the integration time of the CCD 15. The image signals generated by the CCD 15 are modified in a similar manner by the characteristic lines in the LUT 16.

Instead of using the flat CCD 18 to generate information about the master 4, the scanning operation performed by the CCD 15 itself can be used to obtain such information. However, because of the large number of points, a suitable reduction in the amount of data is then required.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of copying a master, comprising the steps of scanning said master using a scanning device with a substantially linear scanning range; establishing the actual degree of exposure of at least a portion of said master prior to said scanning step; and controlling the amount of light received by said scanning device or the time during which light is received by said scanning device based on the established actual degree of exposure so that at least one portion of said master which is significant in reproduction of said master is scanned within the linear scanning range, whereby said controlling step comprises fixed exposure or sensitivities of said scanning device and further comprising the steps of generating signals, which represent an image of said master, with said scanning device, and modifying said signals using one of a plurality of fixed families of stored characteristic curves, said plurality of fixed families of stored characteristic curves each is comprised of at least two curve, each of said two curves being generated by photographing the same object under different exposure conditions to generate density signals of the exposed areas said one family being selected on the basis of at least one of a plurality of properties of said master, whereby said fixed exposure or sensitivities of said scanning device are assigned to said fixed families of said characteristic curves.

2. The method of claim 1, further comprising the steps of generating signals, which represent an image of said master, with said scanning device, and modifying said signals using a characteristic curve of modification data selected on the basis of at least one of a plurality of properties of said master.

3. The method of claim 2, wherein said master is a film and said plurality of properties include degree of exposure, color temperature and film type.

4. The method of claim 2, wherein the scanning step is performed pointwise along a plurality of lines; and further comprising the step of printing an image of said master on copy material pointwise along a plurality of lines using the modified signals.

5. The method of claim 4, further comprising the step of electronically enhancing the modified signals prior to the printing step.

6. The method of claim 1, wherein the controlling step comprises controlling the illumination intensity or the duration of integration of the scanning step.

7. The method of claim 1, wherein said scanning device comprises a photoreceiver.

8. The method of claim 7, wherein said photoreceiver comprises a CCD.

9. The method of claim 1, wherein the establishing step comprises determining an integral density of at least the portion of said master, classifying said portion as light or dark, and adjusting said integral density accordingly.

10. The method of claim 9, wherein said classifying comprises visually evaluating said master.

11. The method of claim 1, wherein the establishing step comprises weighting a plurality of densities corresponding to a plurality of different regions of said master according to a plurality of positions of each of said plurality of regions in said master to obtain a plurality of weighted density values, and summing said plurality of weighted density values.

12. The method of claim 11, wherein said weighting and summing are performed automatically.

13. The method of claim 11, further comprising the step of generating signals, which represent an image of said master, with said scanning device; and wherein the establishing step further comprises branching off a first number of signals from said scanning device, and reducing the first number of branched-off signals to a second number of branched-off signals, said weighting being performed using the second number of branched-off signals.

14. The method of claim 1, wherein said master is colored; and further comprising the steps of generating a plurality of sets of signals each of which represents an image of said master in a different color, and modifying each of said sets of signals using a respective characteristic curve selected on the basis of at least one of a plurality of properties of said master.

15. The method of claim 14, wherein each of said characteristic curves is used to compensate for a density-dependent color error of said master.

16. The method of claim 1, wherein the controlling step comprises adjusting the sensitivity of said scanning device to said master by means of a light-attenuating device.

17. The method of claim 16, wherein said light-attenuating device comprises an adjustable diaphragm.

18. The method of claim 16, wherein said light-attenuating device comprises a gray filter which is pivotable to and from a position in front of said scanning device.

19. The method of claim 1, wherein the controlling step comprises adjusting the sensitivity of said scanning device to said master by varying an integration time of said scanning step.

20. The method of claim 19, wherein said varying is performed electronically.

21. The method of claim 2, wherein, said characteristic curve constitutes part of at least one set of characteristic curves obtained by making a plurality of transparencies of a gray scale image, each image being at a different exposure, scanning each of the plurality of transparencies with a scanner to generate density signals, plotting a respective empirical curve for each of the plurality of transparencies showing density signal magnitude as a function of density, and inverting the empirical curves, the scanning of the transparencies being performed in such a manner that the magnitude of the density signal for a predetermined step of the gray scale image is the same for all transparencies.

22. The method of claim 21, wherein additional sets of characteristic curves are obtained similarly to said one set of characteristic curves but under different conditions.

23. The method of claim 22, wherein said master comprises film and each of said additional sets of characteristic curves is obtained similarly to said one set of characteristic curves but with different illumination, different film type or both different illumination and different film type.

24. The method of claim 22, further comprising the step of manually selecting said one set of characteristic curves for use with said master.

25. The method of claim 1, further comprising the steps of generating signals, which represent an image of said master, with said scanning device, and modifying said signals using one of a plurality of stored characteristic curves, said one characteristic curve being selected on the basis of at least one of a plurality of properties of said master.

26. The method of claim 23, wherein said characteristic curves are stored in a look-up table.

27. The method of claim 14, wherein said plurality of properties include degree of exposure, color temperature and film type.

28. The method of claim 1, wherein said at least two curves comprise at least three curves, one of said curves corresponds to an overexposed object, a second one of said curves corresponds to a properly exposed object and a third one of said curves corresponds to an underexposed object.

* * * * *